United States Patent [19]
Makino et al.

[11] Patent Number: 5,321,235
[45] Date of Patent: Jun. 14, 1994

[54] HALF-BRIDGE CONVERTER SWITCHING POWER SUPPLY FOR MAGNETRON

[75] Inventors: Yasuhiro Makino; Etsuko Yamamoto; Etsuo Sakoguchi, all of Osaka; Katsuhiko Ito, Shiga, all of Japan

[73] Assignee: Sanyo Electric Co., Ltd., Osaka, Japan

[21] Appl. No.: 891,956

[22] Filed: Jun. 1, 1992

[30] Foreign Application Priority Data

| Jun. 4, 1991 | [JP] | Japan | 3-133020 |
| Jun. 4, 1991 | [JP] | Japan | 3-133021 |
| Jun. 4, 1991 | [JP] | Japan | 3-133022 |
| Jun. 4, 1991 | [JP] | Japan | 3-133023 |

[51] Int. Cl.⁵ ............................................ H05B 6/68
[52] U.S. Cl. ........................ 219/10.55 B; 363/21; 363/98
[58] Field of Search ............ 219/10.55 B; 363/21, 363/97, 98

[56] References Cited

U.S. PATENT DOCUMENTS

| 4,777,575 | 10/1988 | Yamato et al. | 363/21 |
| 4,866,589 | 9/1989 | Satoo et al. | 363/21 |
| 4,920,246 | 4/1990 | Aoki | 219/10.55 B |
| 5,124,518 | 6/1992 | Lee | 219/10.55 B |

FOREIGN PATENT DOCUMENTS

| 52-35502 | 3/1977 | Japan | 219/10.55 B |
| 52-59340 | 5/1977 | Japan | 219/10.55 B |
| 63-269495 | 11/1988 | Japan | 219/10.55 B |
| 3-171587 | 7/1991 | Japan | 219/10.55 B |
| 4-87185 | 3/1992 | Japan | 219/10.55 B |
| 4-101387 | 4/1992 | Japan | 219/10.55 B |

*Primary Examiner*—Philip H. Leung
*Attorney, Agent, or Firm*—Darby & Darby

[57] ABSTRACT

A power source apparatus for microwave oven includes a half-bridge converter including a series connection of switching elements, a series connection of resonance capacitors, and a high frequency transformer having a primary winding and a secondary winding, and the half-bridge converter is driven by an output of a diode bridge which receives a commercial power source of 200 V. A current transformer detects a current of the primary winding. A control circuit compares a voltage equal to an average value of the current detected by the current transformer and a voltage set by a microcomputer, and controls the switching elements at a frequency in proportion to a magnitude of a difference of the both voltages, whereby a high frequency high voltage is induced on the secondary winding and applied to a voltage doubler rectifying circuit, and then a direct current high voltage is applied to a magnetron.

30 Claims, 18 Drawing Sheets

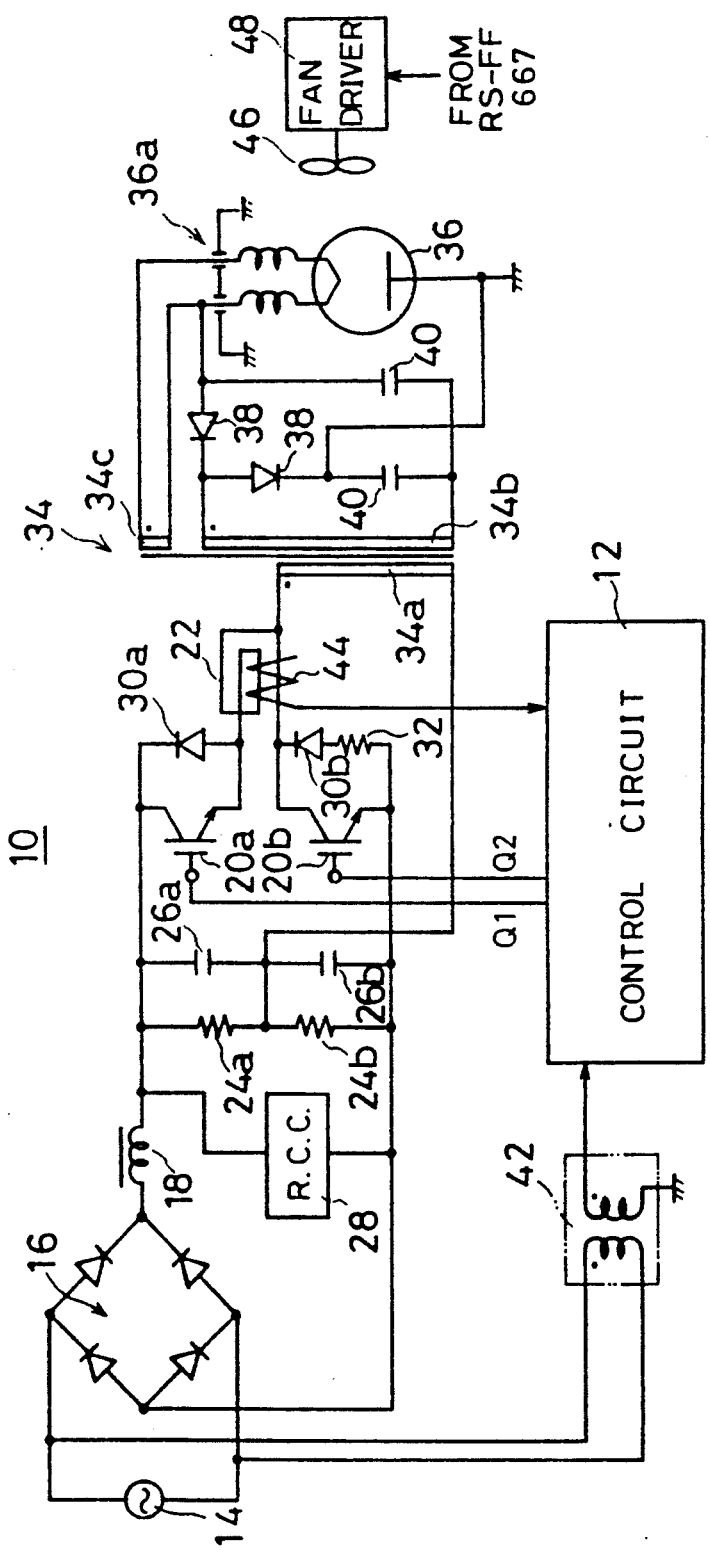
F I G. 1

F I G. 2
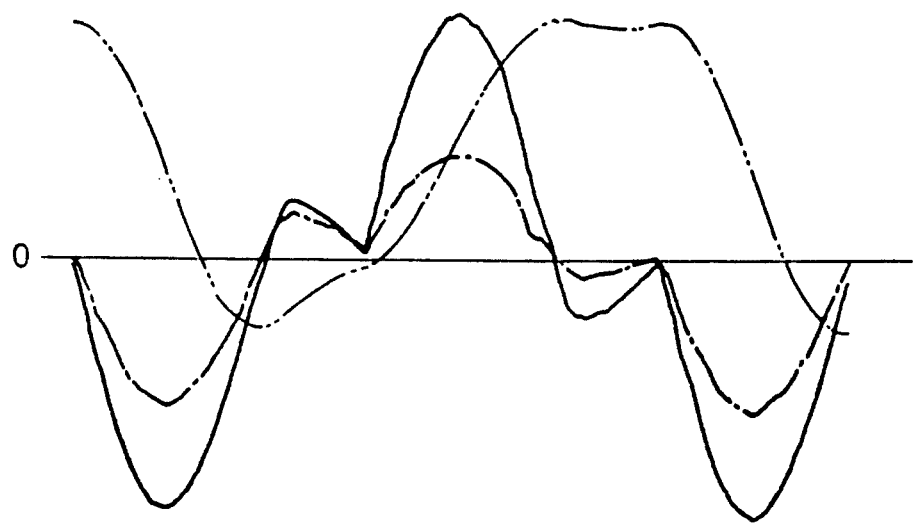
F I G. 3
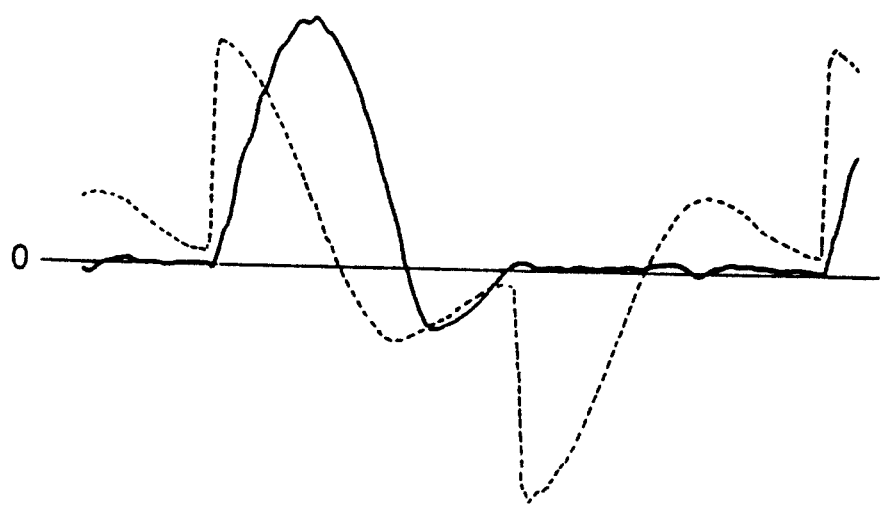

F I G. 5
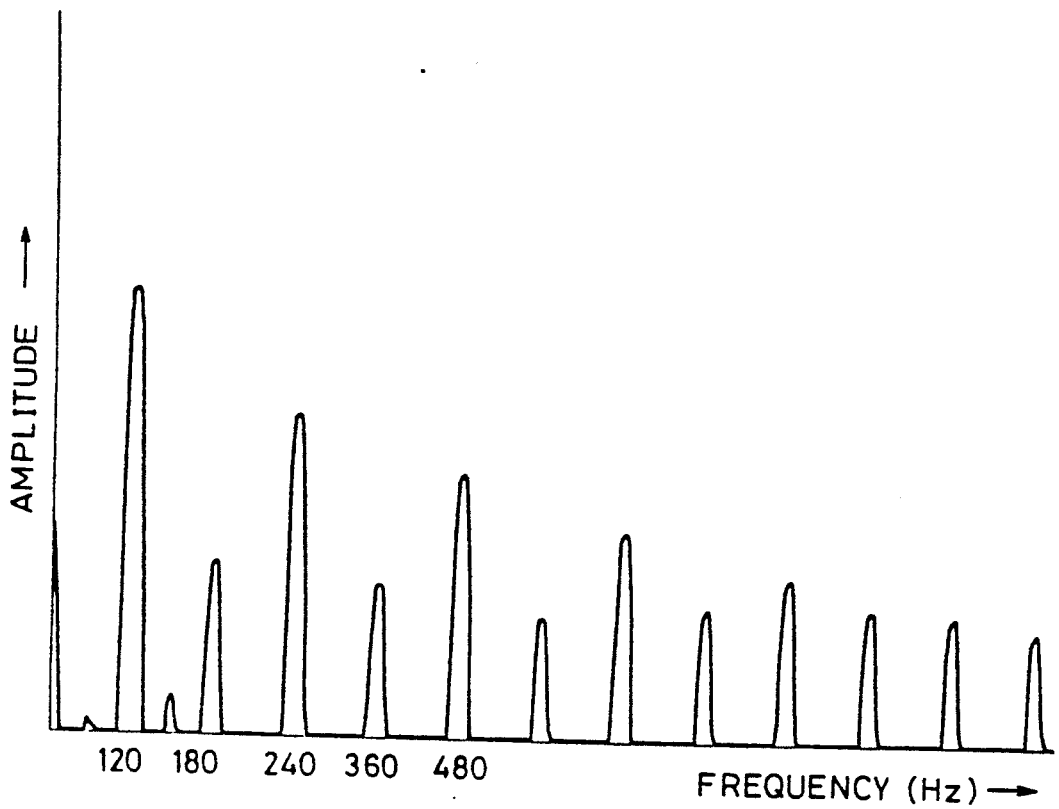
F I G. 6
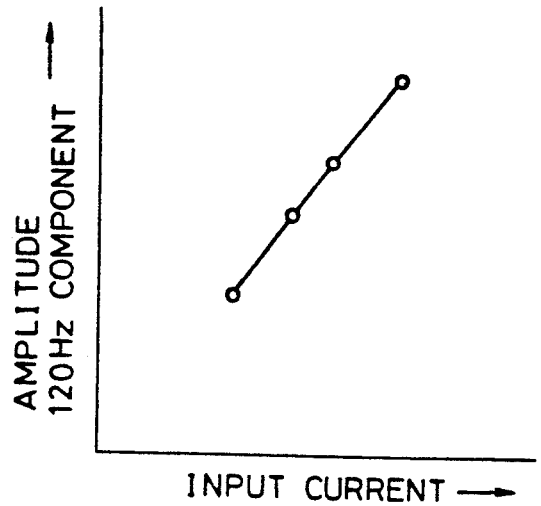

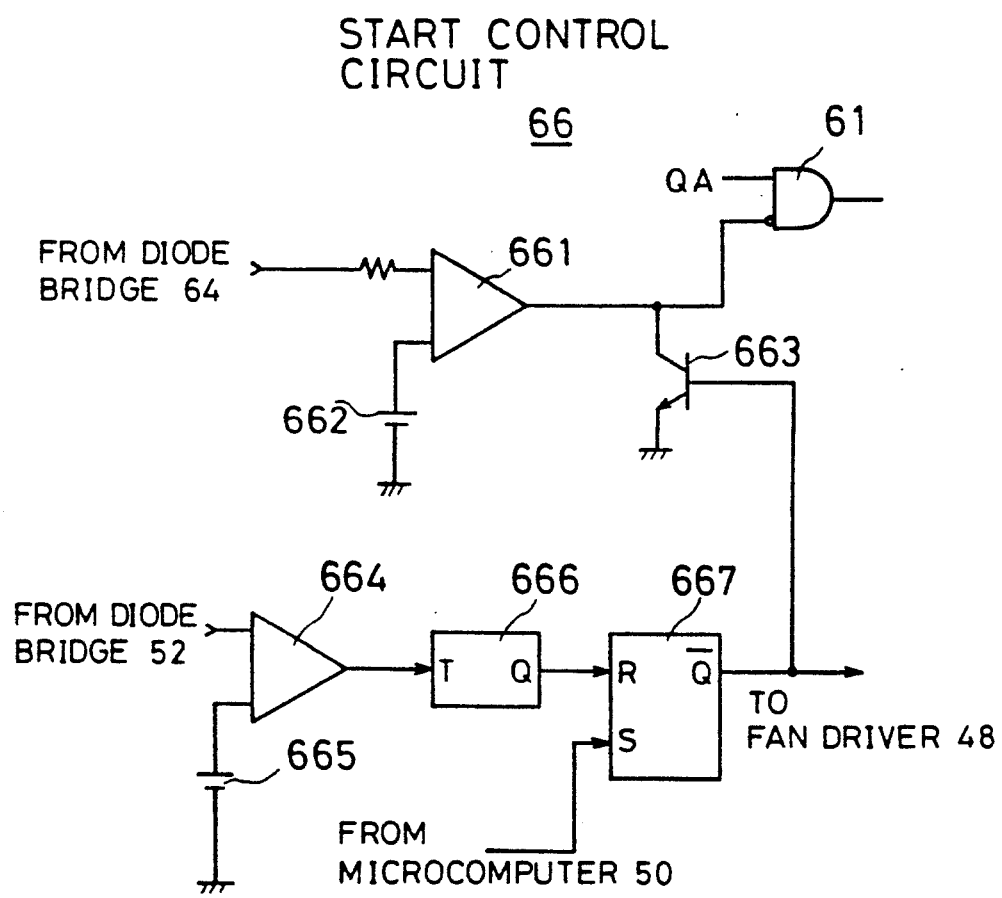
F I G. 12

OSCILLATION STOPPED

F I G. 16
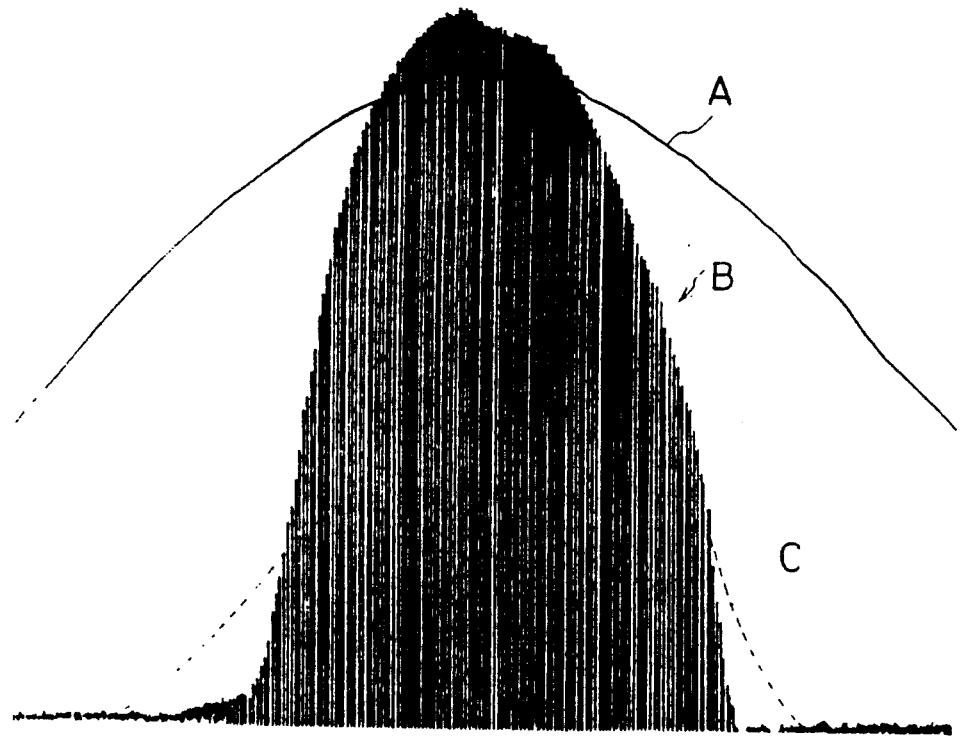

FIG. 18(G) Hi

FIG. 19(B) Vref 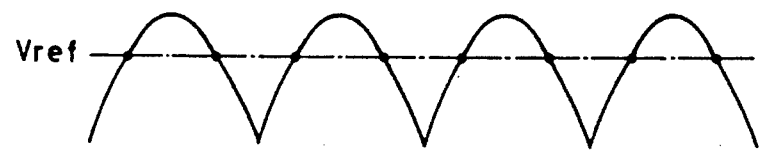

FIG. 19(G) Lo 

F I G. 20
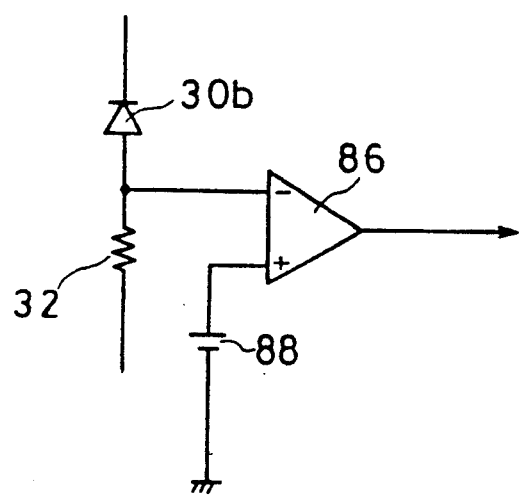

F I G. 22
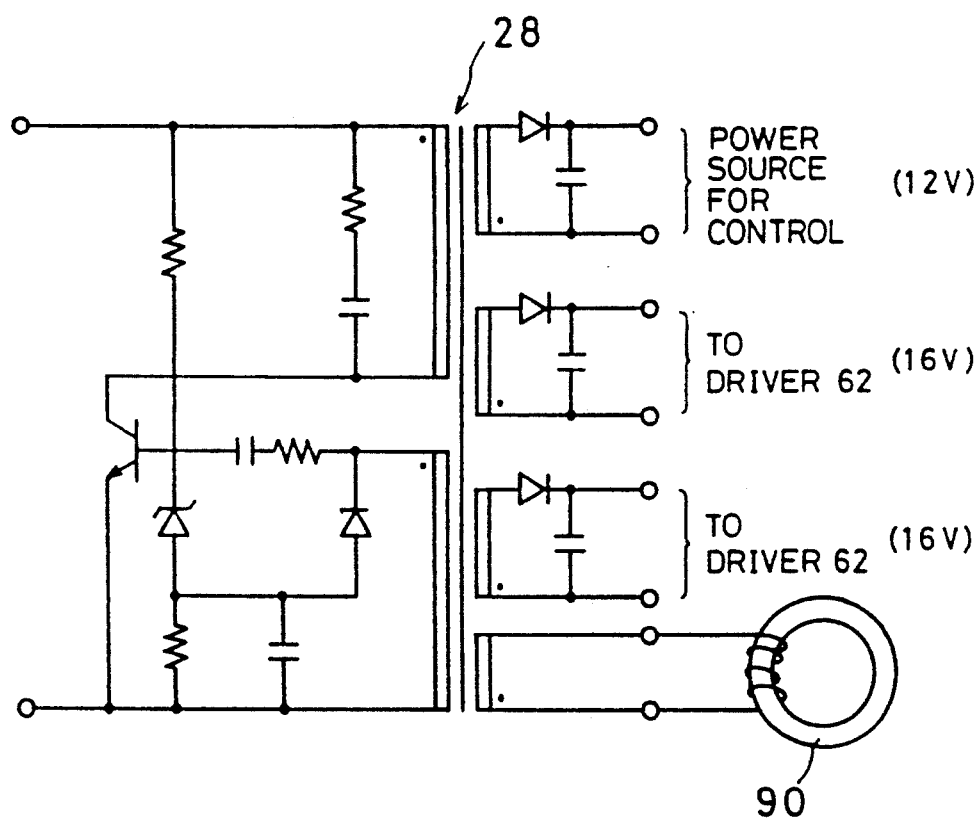

HALF-BRIDGE CONVERTER SWITCHING POWER SUPPLY FOR MAGNETRON

BACKGROUND OF THE INVENTION

1. Field of the invention

The present invention relates to a power source apparatus for microwave oven. More specifically, the present invention relates to a novel power source apparatus for microwave oven which is suitable for a commercial power source of a relatively high voltage, for example, 200 V or 220 V.

2. Description of the prior art

One example of an inverter circuit which can utilized as a power source apparatus for microwave oven is disclosed in Japanese Patent Laying-open No. 52-35903 (H05B6/66) laid open on Mar. 18, 1977 or Japanese Patent Laying-open No. 59-191290 (H05B6/68) laid open on Oct. 30, 1984. This prior art is a power source apparatus utilizing an inverter of a voltage resonance system, and a resonance time constant thereof is decided by leakage inductance of a high frequency transformer, inductance of primary and secondary windings of the high frequency transformer, and a resonance capacitor. In an inverter circuit of such a voltage resonance system, a fluctuation of an input voltage of a main circuit, that is, a fluctuation of a power source voltage of a commercial power source results in a fluctuation of a resonance voltage. Therefore, it is necessary to use a switching element having a large withstand voltage by taking such a fluctuation of the resonance voltage into account. For example, if the input voltage is 100 V, a peak voltage thereof becomes approximately 141 V ($=100\sqrt{2}$), and therefore, a resonance voltage of approximately 600 V is applied to the switching element at a rated input voltage. Therefore, since the resonance voltage varies according to the fluctuation of the input voltage, in the above described case, a switching element having a rating of 900 V/50 A, for example, is used.

On the other hand, recently, it is proposed that a commercial power source of 200 V is utilized for obtaining a cooking apparatus such as a microwave oven with a large capacity, a high speed and etc. When the above described input voltage of the inverter circuit becomes 200 V, a switching element having a rating of approximately 1800 V/30 A is needed. However, a switching element which operates in a high frequency region for a power source apparatus for microwave oven and has such a large withstand voltage is not put into practical use. Therefore, the inverter circuit is disclosed in the Japanese Patent Laying-open No. 52-35903 or Japanese Patent Laying-open No. 59-191290 cannot be utilized as a power source apparatus for microwave oven which is driven by a commercial power source of 200 V.

Furthermore, in Japanese Patent Laying-open No. 2-101962 (H02M3/28, 3/335) laid open on Apr. 13, 1990, it is disclosed a half-bridge converter in which a series circuit of two switching elements, a series circuit of two resonance capacitors and a series circuit of two feed-back diodes are connected to a direct current power source, and a series circuit of a primary winding of a transformer and a first resonance inductor is connected between a connection point of the two switching elements and a connection point of the two resonance capacitors. A half-bridge converter disclosed this prior art is a circuit which is intended to be used for a stabilized power source apparatus mainly, and therefore, there is no proposal that such a half-bridge converter is utilized as a power source apparatus for microwave oven.

Although it is possible to consider that the half-bridge converter disclosed in the Japanese Patent Laying-open No. 2-101962 is utilized as a power source apparatus for microwave oven, the half-bridge converter of this prior art cannot be utilized as it is. More specifically, in the above described prior art, in order to control an output voltage of the half-bridge converter, a switching frequency of the two switching elements is controlled by an error voltage of an output voltage of a load and a reference voltage; however, a magnetron which is utilized in a microwave oven is a constant voltage load with respect to the half-bridge converter, and therefore, in order to control the output power of the magnetron, an output current is to be detected. In such a case, a current transformer for detecting the output current of the magnetron may be provided at a secondary circuit of a high frequency transformer and an output of the current transformer may be inputted to a control circuit. However, in a practical circuit, at a view point of safety, it is needed to isolate the secondary circuit of the high frequency transformer and the control circuit from each other, and therefore, it becomes necessary to use a current transformer having a large creeping distance and a large space distance. Therefore, a power source apparatus becomes large and high cost. In addition, in the half-bridge converter of the prior art, the resonance inductor is connected in series to the primary winding, and therefore, in order to implement a power source apparatus for microwave oven having a resonance frequency of 50 kHz and a magnetron output power of 800 W, for example, it is necessary to use a large resonance inductor having inductance of 10 $\mu$H approximately. Therefore, in a case where the half-bridge converter disclosed in the Japanese Patent Laying-open No. 2-101962 is used as it is, a power source apparatus for microwave oven becomes large and high cost.

SUMMARY OF THE INVENTION

Therefore, a principal object of the present invention is to provide a novel power source apparatus for microwave oven.

Another object of the present invention is to provide a power source apparatus for microwave oven which is provided with a half-bridge converter, but small and low cost.

A power source apparatus for microwave oven according to the present invention comprises: a half-bridge converter which is driven by a commercial power source and includes a first series connection of first and second switching elements, a second series connection connected in parallel to the first series connection and including first and second resonance capacitors, and a high frequency transformer including a primary winding connected between a connection point of the first series connection and a connection point of the second series connection and a secondary winding magnetically coupled to the primary winding for supplying a voltage to a magnetron having a heater; setting voltage output means for outputting a setting voltage for commanding a desired output power of the magnetron; current detecting means for detecting a current flowing in the primary winding; averaging means for averaging the current detected by the current detecting means; error voltage output means for outputting an error voltage according to a difference between a voltage obtained by the averaging means and the setting voltage; and switching control means for controlling the first and second switching elements on the basis of a magnitude of the error voltage.

The commercial power source is applied as an input voltage of the half-bridge converter through a diode bridge. The first and second switching signals having phases different from each other are applied to the first and second switching elements such as field effect transistors or IGBTs (Insulated Gate Bipolar Transistor) from the switching control means. Therefore, the first and second switching elements are turned-on or off alternately, and therefore, the half-bridge converter oscillates at a resonance time constant determined by primary leakage inductance of the high frequency transformer and the first and second resonance capacitors. The first and second switching elements are connected in series to each other by a connecting line to which a current transformer which functions as the current detecting means is magnetically coupled. The current transformer detects a current flowing in the first and second switching elements, that is, a current flowing in the primary winding. An output of the current transformer is inputted to the averaging means such as a band-pass filter or low-pass filter through a diode bridge, for example. An error voltage having a magnitude according to a difference between a voltage having a level equal to an averaged current obtained by the averaging means and the setting voltage commanding the desired output voltage of the magnetron from the setting voltage output means such as a microcomputer is outputted from the error voltage output means. The switching control means includes V/F converting means, for example, and outputs first and second switching signals each of which has a frequency in proportion to the magnitude of the error voltage but having a constant ON time, and applies the same to the first and second switching elements.

According to the present invention, the output power of the half-bridge converter, that is, the output power of the magnetron can be feedback-controlled on the basis of the current detected by the current detecting means. Therefore, in comparison with a case where the half-bridge converter disclosed in the Japanese Patent Laying-open No. 2-101962 is utilized as it is, it is possible to obtain a smaller and cheaper power source apparatus for microwave oven.

In the embodiments, rectifying means such as a diode bridge is inserted between the commercial power source and the half-bridge converter so that the half-bridge converter is driven by an output of the rectifying means, and a choke coil is connected between the rectifying means and the half-bridge converter.

In one aspect of the present invention, the above described switching control means includes switching signal generating means for generating the first and second switching signals in a dual mode to alternately turn-on the first and second switching elements at the frequency in proportion to the magnitude of the error voltage. The power source apparatus for microwave oven further comprises: voltage detecting means for detecting a level of a voltage of the commercial power source; and control means for controlling the switching signal generating means so as to generate the first and second switching signals in the dual mode in response to a detection output that the voltage level of the commercial power source detected by the voltage detecting means is less than a predetermined value after the first and second switching signals are generated as signals in phase.

In this aspect, as the voltage detecting means, a potential transformer and a comparator are used, and by comparing an output voltage of the potential transformer and a reference value, it can be determined that the voltage level of the commercial power source is less than the predetermined value. At this time, the control means controls the switching signal generating means so that the single mode and the dual mode are repeated. In the single mode, the first and second switching signals become in phase, and therefore, the first and second switching elements are simultaneously turned-on. Accordingly, a current flows in a path of the rectifying means, the choke coil, and the first and second switching elements. Therefore, an energy is stored in the choke coil. In a succeeding dual mode, phases of the first and second switching signals become different from each other, and therefore, the first and second switching elements are turned-on alternately. When the first switching element or the second switching element is turned-on, the energy stored in the choke coil increases an input voltage of the half-bridge converter. Therefore, a beginning of an oscillating operation of the half-bridge converter is advanced and an end of the oscillating operation is delayed, and therefore, the primary current becomes larger. Accordingly, an improvement of a power factor can be expected.

In another aspect of the invention, a power source apparatus for microwave oven further comprises: start detecting means for detecting on the basis of the output of the current detecting means whether or not the magnetron has been started; stopping means for stopping at least one of the first and second switching signals in response to a detection signal that the voltage level of the commercial power source exceeds a predetermined value when it is detected by the start detecting means that the magnetron has not been started; and releasing means for releasing a stop of at least one of the first and second switching signals in response to a detection signal by the start detecting means that the magnetron has been started.

The voltage detecting means detects whether or not the voltage level of the commercial power source exceeds the predetermined value as described above. The start detecting means detects weather or not the magnetron has been started on the basis of the output of current detecting means. A flip-flop constituting a part of the stopping means and the releasing means becomes a first state in response to a detection output from the voltage detecting means and becomes a second state in response to a detection signal from the start detecting means. In response to a first output of the flip-flop, at least one of the first and second switching signals is gated to be inhibited from being applied to at least one of the first and second switching elements. Therefore, an oscillating operation of the half-bridge converter is stopped when the voltage level of the commercial power source exceeds the predetermined value in a state where the magnetron has not been started. Then, the above described gating is released in response to a second output of the flip-flop. Thus, the half-bridge converter oscillates intermittently.

According to this aspect, a secondary voltage of the high frequency transformer is suppressed. Therefore, no high surge voltage is applied to the magnetron, the high frequency transformer, and secondary circuit, and therefore, it is possible to use components each having a relatively small insulation withstand voltage as these components, and thus, the power source apparatus becomes further small and cheap.

In another aspect, the present invention further comprises: a power source circuit for supplying a voltage to the switching signal generating means to generate the first and second switching signals; and heater current supplying means for supplying a current to the heater of the magnetron from the power source circuit.

The power source circuit includes a ringing choke converter, for example, and the power source circuit is connected to an output of a full-wave rectifying circuit. The ringing choke converter generates a voltage for control, a voltage for the switching signals and a voltage for the heater, and the voltage for the switching signals is applied to the switching signal generating means. Therefore, the first and second switching signals of predetermined voltages are outputted from the switching signal generating means. The voltage for the heater is applied to the heater of the magnetron via a ring core, for example.

In general, a high frequency filter is connected to the heater of the magnetron, and therefore, in order to control the output power of the magnetron, an operating frequency of the half-bridge converter is changed; however, if the heater current is supplied from the power source circuit as done in the invention, it is possible to supply the heater current stably in spite of the operating frequency.

In addition, since the heater current of the magnetron is supplied from the power source circuit which is indispensable to the half-bridge converter, the magnetron operates stably without any additional circuits in spite of the output power of the half-bridge converter, that is, the operating frequency thereof.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a circuit diagram showing one embodiment according to the present invention;

FIG. 2 is a waveform chart showing currents or voltages of respective portions in FIG. 1 embodiment;

FIG. 3 is a waveform chart showing currents or voltages of respective portions of FIG. 1 embodiment;

FIG. 5 is a graph showing a frequency spectrum representing a harmonic component of a primary current of a high frequency transformer in FIG. 1 embodiment;

FIG. 6 is a graph showing a relationship of a 120 Hz component with respect to an input current of a half-bridge converter;

FIG. 12 is a circuit diagram showing one example of a start control circuit shown in FIG. 4;

FIG. 16 is a waveform chart showing an operation of the modified example shown in FIG. 14;

FIGS. 18(A)-18(G) are waveform charts showing an operation of the diode failure detecting circuit shown in FIG. 17 in a normal state;

FIGS. 19(A)-19(G) are waveform charts showing an operation of the diode failure detecting circuit shown in FIG. 17 in an abnormal state;

FIG. 20 is a circuit diagram showing another example of the diode failure detecting circuit;

FIG. 22 is a circuit diagram showing a ringing choke converter of a modified example of FIG. 21.

DETAILED DESCRIPTION OF THE PREFERRED EMBODIMENTS

Figure 4:
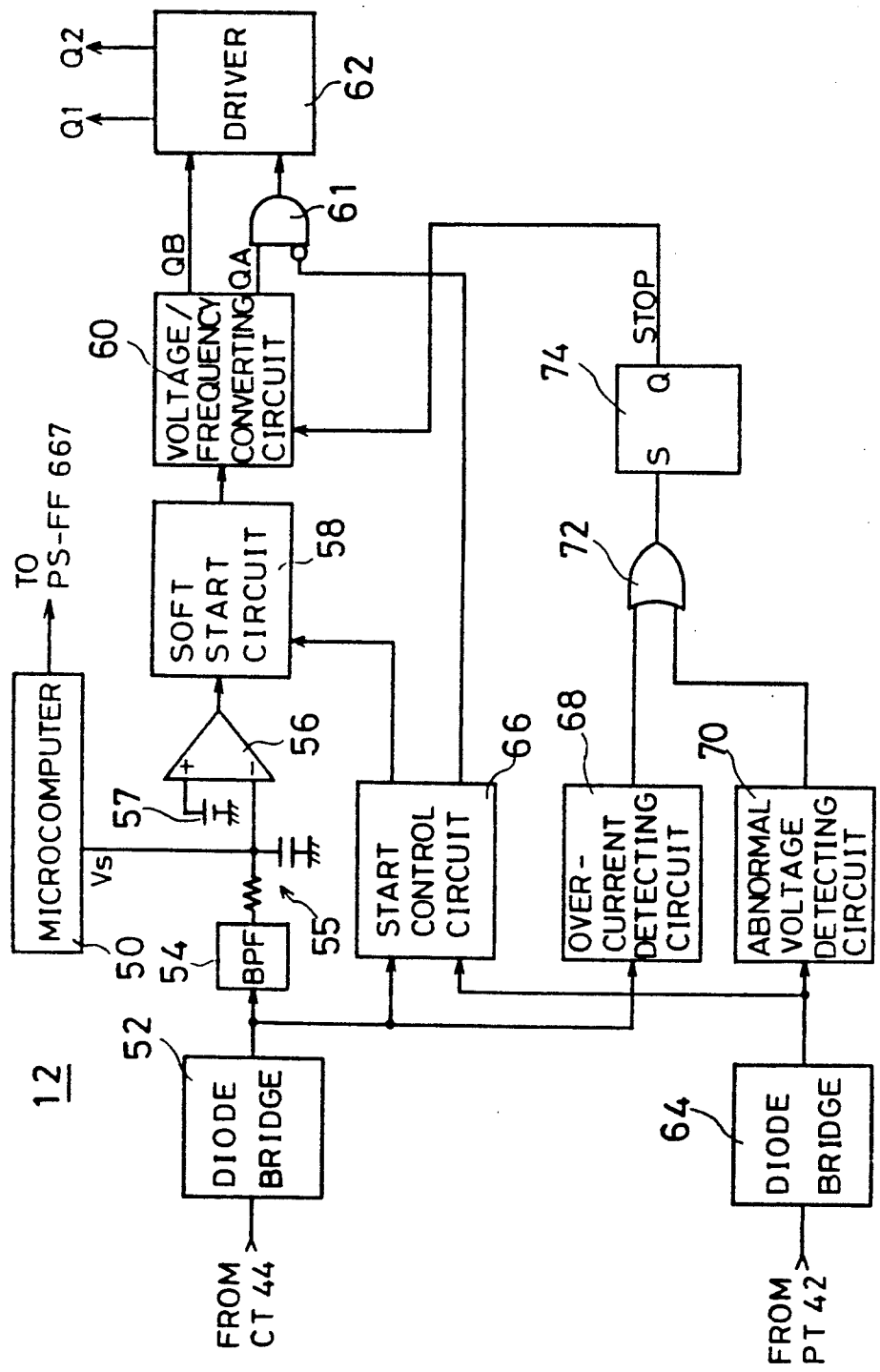
FIG. 4 is a block diagram showing a control circuit of FIG. 1 embodiment in detail.

FIG. 1 is a circuit diagram showing one embodiment according to the present invention. A power source apparatus for microwave oven 10 of this embodiment includes a main circuit which is controlled by a control circuit 12. The main circuit is mainly constructed by a half-bridge converter and receives an alternate current voltage of 200 V from a commercial power source 14. The alternate current voltage of 200 V is full-wave rectified by a diode bridge 16, and the half-bridge converter is connected to an output of the diode bridge 16 via a normal mode choke coil 18.

More specifically, to the output of the diode bridge 16, a series connection of switching elements 20a and 20b is connected via the normal mode choke coil 18. As each of the switching element 20a and 20b, an IGBT is utilized in this embodiment shown. The two switching elements 20a and 20b are connected in series to each other by a connecting line 22. A series connection of two discharging resistors 24a and 24b and a series connection of two resonance capacitors 26a and 26b are respectively connected in parallel to the series connection of the switching elements 20a and 20b. Furthermore, a ringing choke converter 28 which generates power source voltage for the control circuit 12 is connected to the output of the diode bridge 16. A diode 30a is connected in parallel to the switching element 20a, and a series connection of a diode 30b and a current detecting resistor 32 is connected in parallel to the switching element 20b.

A primary winding 34a of a high frequency transformer 34 is connected between a series connection point of the two switching elements 20a and 20b and a series connection point of the two resonance capacitors 26a and 26b. Two secondary windings 34b and 34c are respectively magnetically coupled to the primary winding 34a so that an energy stored in the primary winding 34a can be transferred thereto. In addition, each of the above described diodes 30a and 30b plays a role returning an energy stored in the primary winding 34a but not transferred to the secondary windings 34b and 34c to the commercial power source 14. Then, the secondary winding 34b supplies a high voltage between a heater or cathode of a magnetron 36 and an anode thereof, and the secondary winding 34c supplies a heater voltage to the cathode of the magnetron 36. More specifically, a voltage doubler rectifying circuit including diodes 38 and a capacitor 40 is connected to the secondary winding 34b, and an output voltage of the voltage doubler rectifying circuit is applied between the cathode and the anode. In addition, the heater of the magnetron 36 is connected to the secondary winding 34c through a high frequency filter 36a which is incorporated in the magnetron 36.

Furthermore, a potential transformer 42 is connected to the commercial power source 14, that is, an input of the diode bridge 16, and an output of the potential transformer 42 is applied to the control circuit 12. Moreover, a current transformer 44 is magnetically coupled to the connecting line 22 which is wound by one turn as shown in FIG. 1, and an output of the current transformer 44 is also applied to the control circuit 12. By winding once the connected line 22 as shown in FIG. 1, the current transformer 44 can detect a current flowing in the switching element 20a or a current flowing in the switching element 20b individually and a total current of the currents flowing in the switching elements 20a and 20b. More specifically, the current of the switching element 20a flows in a portion of the connecting line 22, and the current becomes the same direction as that of the current of the switching element 20b flowing between the primary winding 34a and the switching element 20b, and therefore, by commonly coupling the current transformer 44 to the above described two current path portions, it is possible to detect the total current of the currents flowing in the switching elements 20a and 20b by the current transformer 44. In addition, since the switching elements 20a and 20b are alternately turned-on, the current transformer 44 can detect individually the currents during respective ON periods of the switching elements 20a and 20b.

In addition, in this embodiment shown in FIG. 1, a cooling fan 46 is disposed in the vicinity of the magnetron 36, and the cooling fan 46 is driven or stopped by a fan driver 48.

The main circuit of the power source apparatus for microwave oven 10 of this embodiment shown in FIG. 1 basically includes a half-bridge converter similar to that disclosed in the Japanese Patent Laying-open No. 2-101962 which is previously recited. More specifically, by alternately turning the switching elements 20a and 20b on or off by switching signals Q1 and Q2 from the control circuit 12, a high frequency current is produced in the primary winding 34a of the high frequency transformer 34 as shown by a solid line in FIG. 2 or FIG. 3. The high frequency current is transformed by the high frequency transformer 34 and a high frequency high voltage is induced on the secondary winding 34b. The high frequency high voltage induced on the secondary winding 34b is converted into a direct current high voltage by a voltage double rectifying circuit, and the direct current high voltage is applied between the cathode and the anode of the magnetron 36, whereby the magnetron 36 oscillates.

In addition, in a normal state, that is, normal oscillation state, a primary current shown by a solid line in FIG. 2 or FIG. 3 flows in the primary winding 34a of the high frequency transformer 34. Furthermore, a current shown by one-dotted line in FIG. 2 flows in the resonance capacity 26a or 26b, and a voltage shown by two-dotted line in FIG. 2 is produced at the resonance capacities 26a and 26b. Then, a voltage of the primary winding 34a of the high frequency transformer 34 is shown by a dotted line in FIG. 3.

The control circuit 12 shown in FIG. 4 includes a microcomputer 50 which controls a cooking time, an output power of the magnetron 36, and etc. As shown by the solid line in FIG. 2 or FIG. 3, the primary current flows in the primary winding 34a of the high frequency transformer 34, and the primary current is detected by the current transformer 44 shown in FIG. 1. The output of the current transformer 44 is given to a diode bridge 52, and an output of the diode bridge 52 is applied to a (−) input of a comparator 56 through a band-pass filter 54 which derives a harmonic component from the current detected by the current transformer 44. A pass-band of the band-pass filter 54 is set, in this embodiment shown, at twice a frequency of the commercial power source 14 shown in FIG. 1, for example, 120 Hz. That is, the band-pass filter 54 derives a component of a frequency twice the power source frequency from the current of the switching elements 20a and 20b, that is, the current of the primary winding 34a. An output of the band-pass filter 54 is averaged by a smoothing circuit 55 including a resistor and a capacitor. A frequency spectrum of the output of the current transformer 44 is shown in FIG. 5, and a 120 Hz component having a largest amplitude in FIG. 5 has a relationship that is correlative to an input current flowing from the commercial power source 14 (FIG. 1) to the half-bridge converter, as shown in FIG. 6. Therefore, by detecting the harmonic component of the output of the current transformer 44 by the band-pass filter 54 and by averaging the same by the smoothing circuit 55, it is possible to equivalently detect the input power of the half-bridge converter. In this embodiment shown, the half-bridge converter is feedback-controlled according to the output of the current transformer 44.

Thus, the harmonic component of the commercial power source 14 is derived by the band-pass filter 54 and averaged by the smoothing circuit 55, and therefore, a voltage equal to an averaged current is applied to the (−) input of the comparator 56 from the smoothing circuit 55. To the same (−) input of the comparator 56, a setting voltage Vs according to an output power of the magnetron 36 that is suitable for a cooking condition set by an user is further applied from the above described microcomputer 50, and a (+) input of the comparator 56 receives a reference voltage 57. Therefore, the comparator 56 outputs an error voltage equal to a difference between the output voltage from the smoothing circuit 55 and the setting voltage Vs from the microcomputer 50. The error voltage is applied to a V/F converting circuit 60 through a soft start circuit 58. In this embodiment shown, as the V/F converting circuit 60, an integrated circuit "GP605" manufactured by GENNUM Corporation, Canada. A functional block diagram of the integrated circuit "GP605" is shown in FIG. 7.

Figure 7:
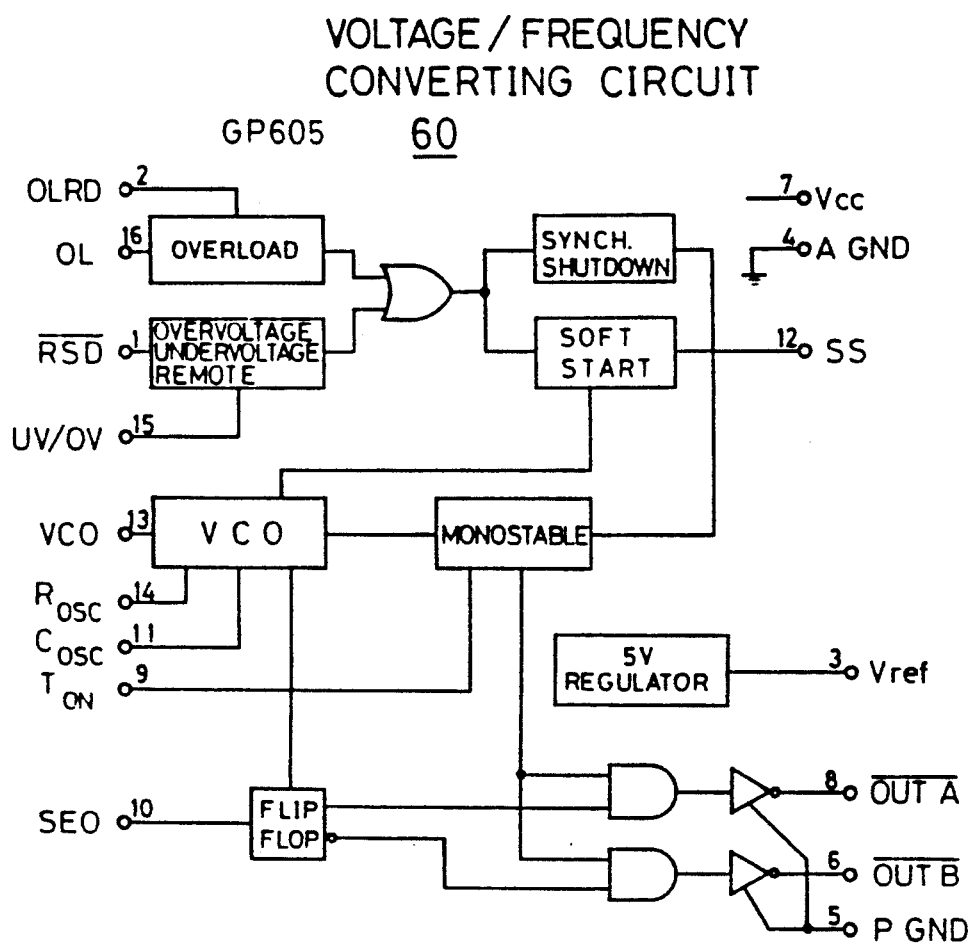
FIG. 7 is a functional block diagram showing one example of a V/F converting circuit in FIG. 4 embodiment.
Figure 8:
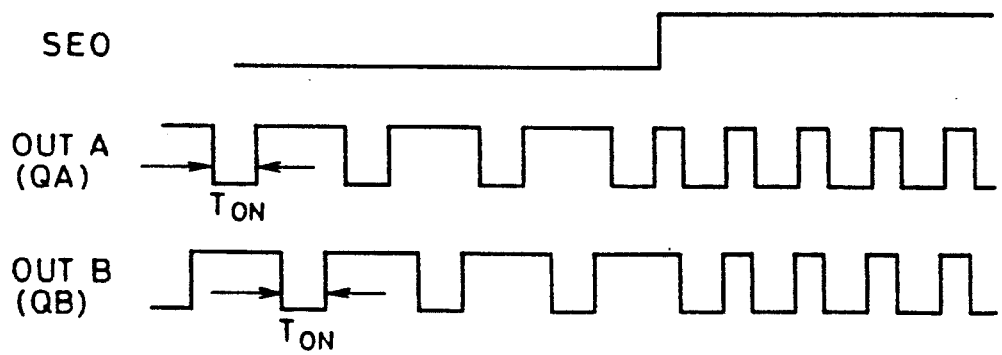
FIG. 8 is a waveform chart showing switching control signals from the V/F converting circuit shown in FIG. 7.
Figure 9:
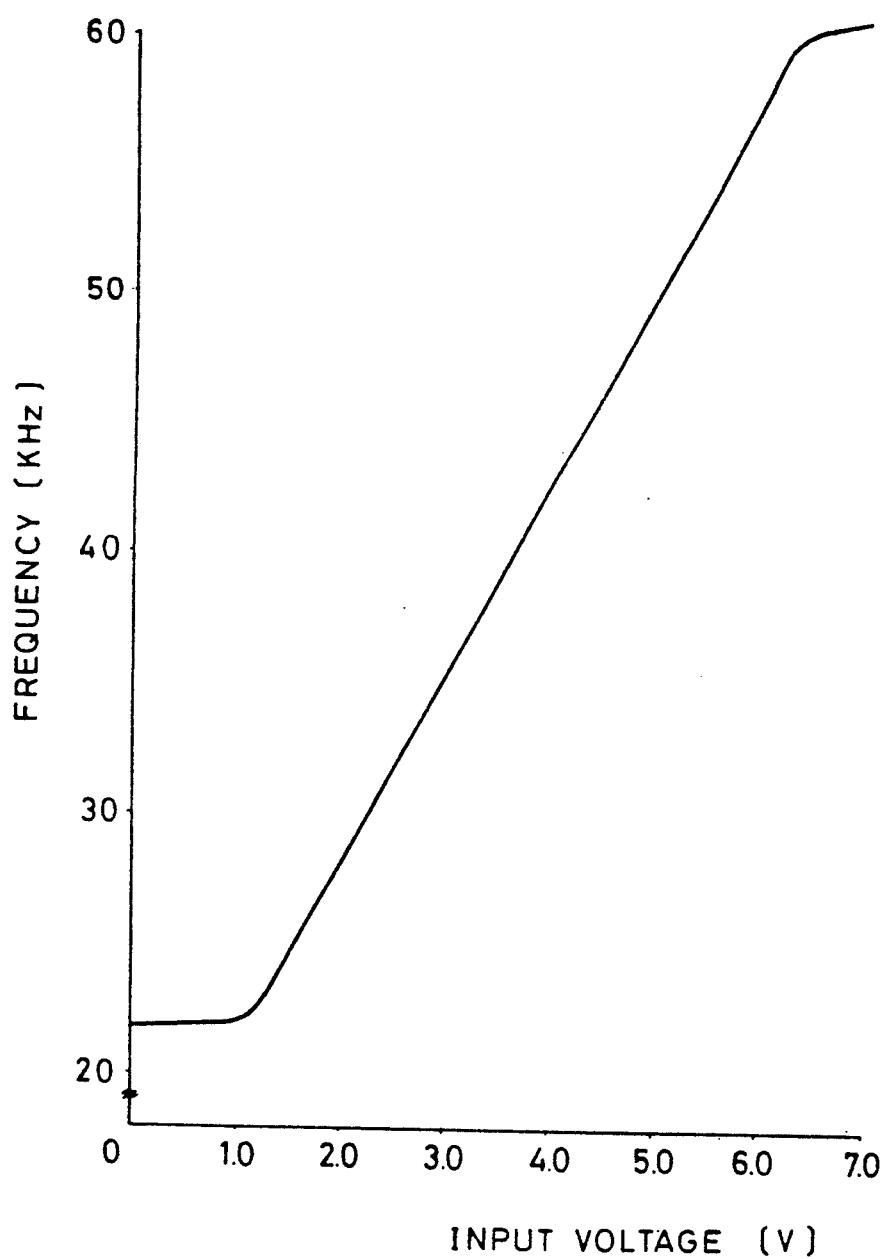
FIG. 9 is a graph showing a relationship of a frequency of the switching control signals with respect to an input voltage of the V/F converting circuit shown in FIG. 7.

The integrated circuit "GP605" is an integrated circuit developed for switching control of a high frequency power source apparatus, and if a voltage is applied to the 13rd terminal shown in FIG. 7, two switching control signals having a frequency in proportion to a magnitude of the applied voltage can be obtained from the 8th terminal and the 6th terminal. Therefore, in this embodiment shown, the output voltage from the comparator 56 is applied to the 13rd terminal of the integrated circuit "GP605". Then, the two switching control signals QA and QB outputted from the 8th terminal and the 6th terminal are shown in FIG. 8. In each of the two switching control signals QA and QB, an ON time $T_{on}$ is constant and a frequency thereof is in proportion to a magnitude of the input voltage, that is, a magnitude of the output voltage of the comparator 56, as shown in FIG. 9.

In addition, the integrated circuit "GP605" outputs the two switching control signals having a phase difference of 180 degrees as shown in FIG. 8 when a signal SEO which is applied to the 10th terminal is a low level, but the two switching control signals become in phase when the signals SEO is a high level, as shown in FIG. 8.

The switching control signal QA shown in FIG. 8 is applied to a driver 62 from the V/F converting circuit 60 via an AND gate 61, and the switching control signal QB is applied to the driver 62 as it is. Although not shown in detail, the driver 62 outputs switching signals Q1 and Q2 of predetermined voltages, for example, 16 V, in synchronous with the switching control signals QA and QB, respectively. As previously described, the switching signals Q1 and Q2 are applied to the gates of the switching elements 20a and 20b, respectively. As the driver 62, a high side/low side switch such as an integrated circuit "IR2110" manufactured by International Rectifier Corporation can be used. However, as the driver 62, circuit structure as shown in FIG. 10 may be utilized.

Figure 10:
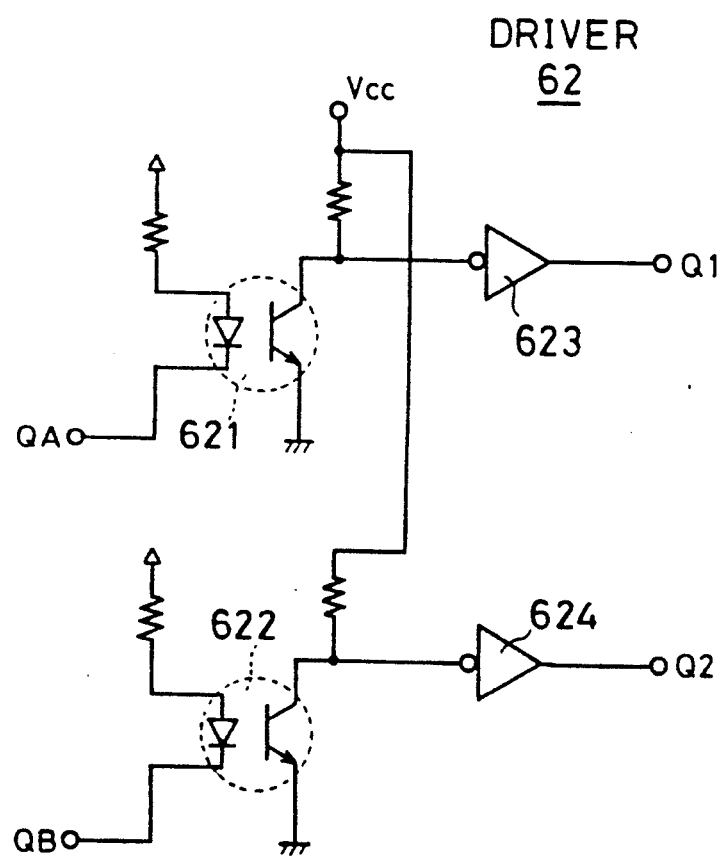
FIG. 10 is a circuit diagram showing one example of a driver shown in FIG. 4.

The driver 62 shown in FIG. 10 includes photocouplers 621 and 622 respectively driven by the switching control signals QA and QB, and outputs of the photocouplers 621 and 622 are outputted as the switching signals Q1 and Q2 through inverting buffer amplifiers 623 and 624, respectively. More specifically, when the switching control signal QA or QB is a high level, that is, an OFF period, the photocoupler 621 or 622 is not driven and, when the switching control signal QA or QB is a low level, that is, an ON period $T_{on}$, the photocoupler 621 or 622 is driven. If the photocoupler 621 or 622 is driven, an input of the inverting buffer amplifier 623 or 624 becomes a low level, and this low level input is outputted as the switching signal Q1 or Q2 of a high level through the inverting buffer amplifier 623 or 624. The switching elements 20a and 20b are alternately turned-on by the switching signals Q1 and Q2, and the half-bridge converter performs an oscillating operation; however, a detailed operation of the half-bridge converter is well known, and therefore, a description thereof will be omitted here.

Figure 11:
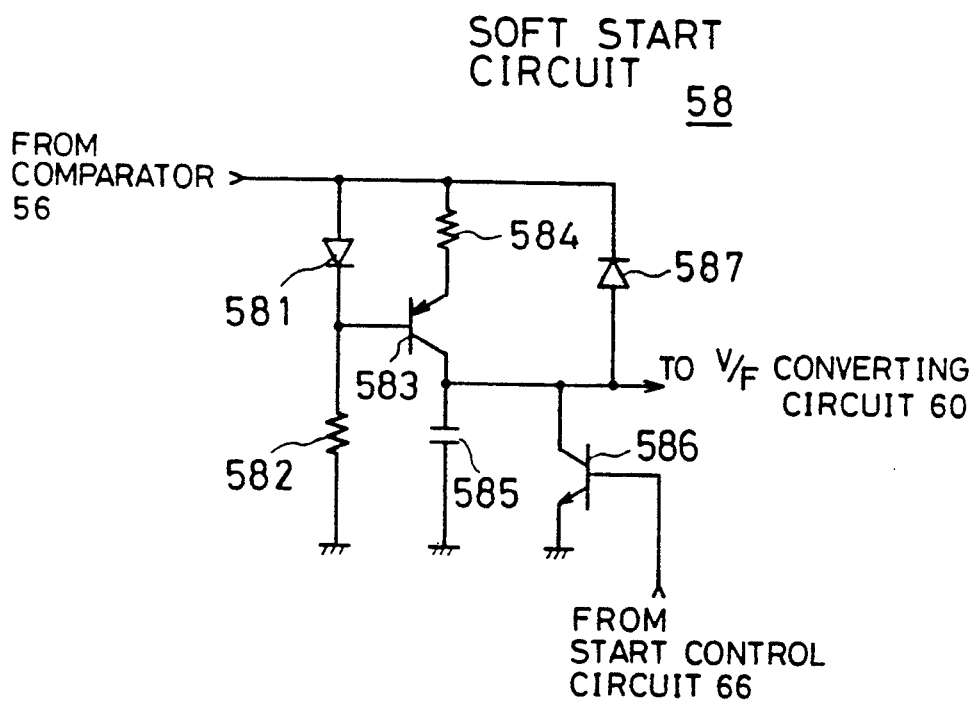
FIG. 11 is a circuit diagram showing one example of a soft start circuit shown in FIG. 4.

The soft start circuit 58 shown in FIG. 4 is a circuit for gradually increasing the input voltage of the V/F converting circuit 60. Although a soft start circuit is incorporated in the above described integrated circuit "GP605", since a delay time is short and an operation thereof becomes different from an operation described later, in this embodiment shown, the incorporated soft start circuit is not utilized. The soft start circuit 58 gradually increases the output power of the magnetron 36 by gradually increasing an oscillation frequency of the switching elements 20a and 20b after a start of an oscillation of the magnetron 36. Specifically, as shown in FIG. 11, the soft start circuit 58 includes a series connection of a diode 581 and a resistor 582, and a base of a transistor 583 is connected to a series connection point of the diode 581 and the resistor 582, and a resistor 584 and a capacitor 585 are connected to an emitter and a collector of the transistor 583, respectively, and therefore, the error voltage from the comparator 56 is applied to the emitter of the transistor 583 through the resistor 584. When the error voltage reaches a predetermined base voltage, the transistor 583 is turned-on, and therefore, the capacitor 585 is charged by the error voltage. Therefore, the error voltage from the comparator 56 is delayed according to a time constant determined by the resistor 584 and the capacitor 585, and the same is applied to the V/F converting circuit 60.

A transistor 586 is connected in parallel to the capacitor 585, and a control signal from a start control circuit 66 (FIG. 2) is applied to a base of the transistor 586. Since the control signal becomes a high level at a start timing, the collector of the transistor 583 is connected to the ground by the transistor 586. Therefore, at the start timing, a voltage of approximately 0 V is applied to the V/F converting circuit 60, and therefore, a frequency of the switching control signals QA and QB, that is, the frequency of the switching signals Q1 and Q2 is low. Therefore, a current of the primary winding 34a (FIG. 1) is small and a high frequency voltage induced on the secondary winding 34b becomes minimum.

Thereafter, if an operation of the magnetron 36 becomes stable sufficiently, the control signal applied to the base of the transistor 586 from the start control circuit 66 becomes a low level, and therefore, the transistor 586 is turned-off. Therefore, the error voltage from the comparator 56 is applied to the V/F converting circuit 60 as it is through the soft start circuit 58. In addition, a diode 587 shown in FIG. 11 forms a discharging path of the capacitor 585.

In such a normal state, the primary current of the primary winding 34a is detected by the current transformer 44, and the harmonic component is derived by the band-pass filter 54 and averaged by the smoothing circuit 55. When a current output power of the magnetron 36 is larger than the output power of the magnetron 36 commanded by the setting voltage Vs from the microcomputer 50, the output voltage of the smoothing circuit 55 (average voltage) becomes larger than the setting voltage Vs, and therefore, the error voltage from the comparator 56 becomes small. Therefore, a frequency of the switching control signals QA and QB from the V/F converting circuit 60 becomes relatively low as shown in FIG. 9, and therefore, a frequency of the switching signals Q1 and Q2 also becomes low. Accordingly, OFF periods of the switching elements 20a and 20b becomes longer and the oscillation frequency of the half-bridge converter becomes lower. Therefore, the primary current also becomes small and the output power of the magnetron 36 becomes small.

In contrast, if a current output power of the magnetron 36 is smaller than the output power of the magnetron 36 commanded by the setting voltage Vs from the microcomputer 50, the output voltage from the smoothing circuit 55 becomes smaller than the setting voltage Vs, and therefore, the error voltage from the comparator 56 becomes large. Therefore, the V/F converting circuit 60 outputs the switching control signals QA and QB having a relatively high frequency. Therefore, an oscillation frequency of the half-bridge converter becomes higher and the primary current increases.

Thus, in this embodiment shown, a magnitude of the primary current of the primary winding 34a of the high frequency transformer 34 is detected by the current transformer 44, and a current feedback loop is formed so as to perform the power control. Therefore, it becomes possible to perform the power control that was difficult to be performed in the circuit disclosed in the Japanese Patent Laying-open No. 2-101962 previously recited.

With reference to FIG. 4, the output voltage of the potential transformer 42 shown in FIG. 1 is applied to a diode bridge 64. Outputs of the two diode bridges 52 and 64 are both applied to a start control circuit 66. The start control circuit 66 makes an intermittent oscillating operation by the switching element 20a in the half-bridge converter until the magnetron 36 starts an oscillating operation. The start control circuit 66 not only operates the soft start circuit 58 but also shifts the above described intermittent oscillating operation to a normal oscillating operation after the oscillation of the magnetron 36 is started. Specifically, the start control circuit 66 includes a comparator 661 which receives an output of the diode bridge 64 at one input thereof as shown in FIG. 12, and a reference voltage 662 is applied to the other input of the comparator 661. An output of the comparator 661 is inverted and applied to the other input of the above described AND gate 61. A transistor 663 is connected between the output of the comparator 661 and the ground. In addition, the output of the diode bridge 52 is applied to one input of a comparator 664, and a reference voltage 665 is applied to the other input of the comparator 664. An output of the comparator 664 is applied to a monostable multivibrator 666 as a trigger input therefor, and an output of the monostable multivibrator 666 is applied to an RS flip-flop 667 as a reset input therefor. A start command signal from the microcomputer 50 (FIG. 4) is applied to a set input of the RS flip-flop 667. An inverted output of the RS flip-flop 667 is applied to a base of the above described transistor 663. In addition, this inverted output is also applied to the fan driver 46 shown in FIG. 1.

Figure 13:
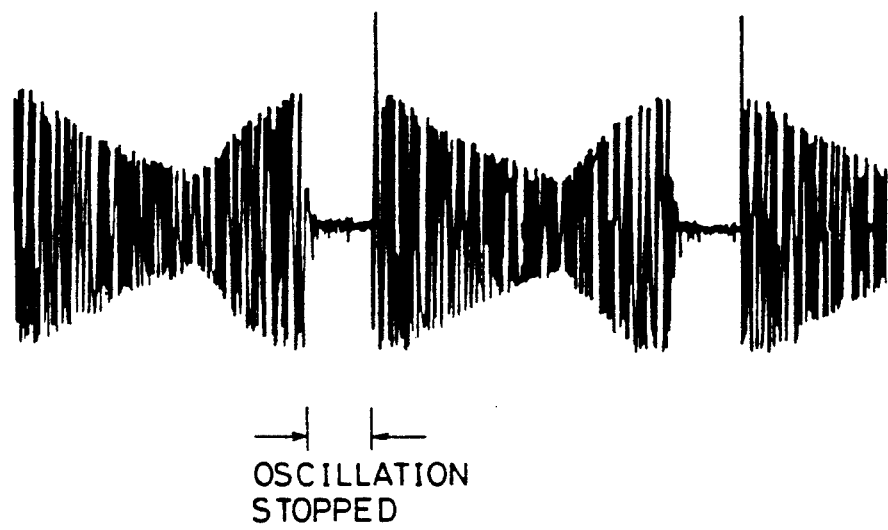
FIG. 13 is a waveform chart of a primary current representing an intermittent oscillating operation performed by the start control circuit shown in FIG. 12.

The comparator 661 determines whether or not the voltage of the potential transformer 42, that is, the input voltage of the main circuit exceeds a predetermined value, and the comparator 664 determines whether or not the output of the current transformer 44, that is, the primary current exceeds a predetermined value. More specifically, at a start timing, since the RS flip-flop 667 is set by the command signal from the microcomputer 50, the inverted output thereof is a low level. Therefore, the transistor 663 is turned-off and, when the output voltage from the diode bridge 64, that is, the voltage of the commercial power supply 14 exceeds a predetermined value, the output of the comparator 661, that is, the input of the AND gate 61 becomes a low level, and therefore, no switching control signal QA from the V/F converting circuit 60 is applied to the driver 62. Therefore, at the start timing, the switching signal Q1 is not outputted from the driver 62, and only the switching signal Q2 is outputted. Therefore, one switching element 20a constituting the half-bridge converter is turned-off when the input voltage of the main circuit becomes a predetermined value, and a resonant operation by the switching element 20a is stopped. Therefore, a high frequency high voltage is not induced on the secondary windings 34b and 34c of the high frequency transformer 34 during when the input voltage of the main circuit exceeds a predetermined level, as shown in FIG. 13. Therefore, at the start timing, it is possible to make the voltage induced on the secondary winding 34b of the high frequency transformer 34 be smaller.

When the oscillation of the magnetron 36 is started, the primary current increases and, when the output voltage of the diode bridge 52 exceeds the reference voltage 665, the output of the comparator 664 becomes a high level, whereby the monostable multivibrator 666 is triggered, and therefore, the RS flip-flop 667 is reset, and the inverted output thereof becomes a high level. Therefore, the transistor 663 is turned-on, and the input of the AND gate 61 is fixed at a high level. Accordingly, the switching control signal QA is applied to the driver 62 as it is, and therefore, the switching elements 20a and 20b perform a normal oscillating operation.

On the assumption that the reference voltage 662 for the comparator 661 is set at a voltage corresponding to 220 V of the commercial power source 14, it is possible to clamp the output voltage of the secondary winding 34b at approximately 8800 V ($=220\times20\times2$: wherein "20" is a turn ratio of the high frequency transformer 34). Therefore, it is possible to make a surge voltage which is produced at a time when the magnetron 36 (FIG. 1) does not oscillate be small, and therefore, it is possible to make the withstand voltages of the high frequency transformer 34, diode 38 and capacitor 40 be small.

If such the start control circuit 66 is not utilized, when the magnetron 36 does not oscillate, a voltage of 11200 V ($=280\times20\times2$) is produced on the secondary winding 34b. This voltage exceeds a rating (10 kV) of the magnetron 36. Therefore, if not used the start control circuit 66, the rating of the magnetron 36 must be made larger and insulation withstand voltages of other components also must be made larger. However, in this embodiment shown, since it is possible to suppress a high voltage of at the start timing by the start control circuit 66, the insulation withstand voltage of the high frequency transformer 34 and etc. can be made smaller, and therefore, it is possible to obtain a power source apparatus for microwave oven with low cost.

In a case where the embodiment shown in FIG. 12, an intermittent voltage as shown in FIG. 13 is induced on the secondary winding 34c, and therefore, a heating time of the heater which is heated by the voltage from the secondary winding 34c becomes long. Therefore, a starting time of the magnetron 36 becomes long. Then, in order to deal with such a new problem, in this embodiment shown, the fan driver 48 (FIG. 1) is controlled by an output of an RS flip-flop. More specifically, to the set input of the RS flip-flop 667, a start command signal from the microcomputer 50 is applied, and therefore, the inverted output of the RS flip-flop 667 becomes a low level in response to this command signal. During a time period that the inverted output of the RS flip-flop 667 is a low level, that is, at the start timing, the fan driver 48 stops the cooling fan 46. Accordingly, even if the heater current of the magnetron 36 is small, the heater can be sufficiently heated for a relatively short time. Therefore, it is possible to prevent the starting time from becoming long by intermittently operating the half-bridge converter at the start timing.

Figure 14:
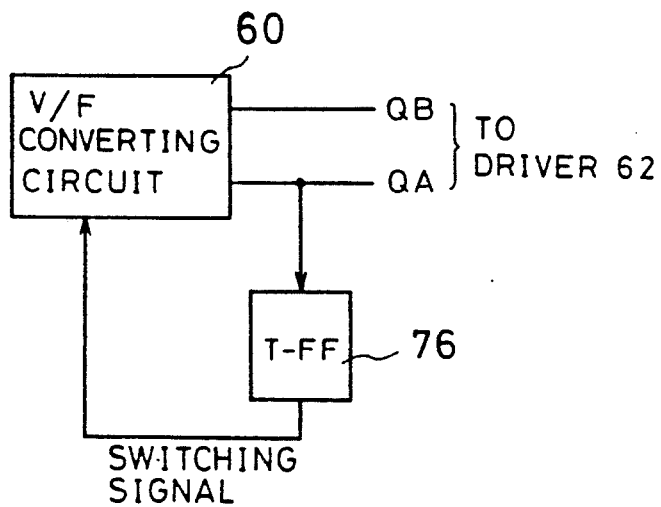
FIG. 14 is a circuit diagram showing a modified example of the V/F converting circuit shown in FIG. 4.
Figure 15:
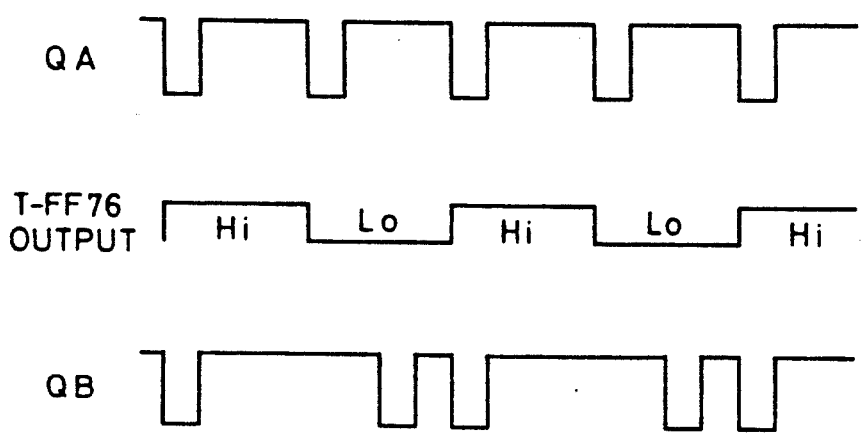
FIG. 15 is a waveform chart showing an operation of the modified example shown in FIG. 14.

In an embodiment shown in FIG. 14, the switching control signal QA from the V/F converting circuit 60 is also applied to a toggle flip-flop 76, and therefore, an output of the toggle flip-flop 76 becomes a high level or a low level at every other switching control signal QA, as shown in FIG. 15. To the toggle flip-flop 76, the output (or an inversion thereof) of the comparator 661 shown in FIG. 12, for example, is applied as an enable signal therefor, and therefore, the toggle flip-flop 76 is enabled when the input voltage of the half-bridge converter is less than the predetermined value. An output of the toggle flip-flop 76 is applied to the 10th terminal of the integrated circuit "GP605" shown in FIG. 7 as a switching signal therefor.

When the switching signal is a high level, the V/F converting circuit 60, that is, the integrated circuit "GP605" operates in a single mode rather than a dual mode. Therefore, in this high level period, the switching control signals QA and QB become signals in phase, as shown in FIG. 15. Accordingly, the switching element 20a and 20b are simultaneously turned-on, and therefore, a current flows in a path of the diode bridge 16, the common mode choke coil 18 and the switching elements 20a and 20b. Therefore, an energy is stored in the common mode choke coil 18. Then, in a succeeding low level period, the switching element 20a is turned-on in synchronous with the switching control signal QA and the switching element 20b is turned-off in synchronous with the switching control signal QB, and therefore, the output of the diode bridge 16 and the energy stored in the common mode choke coil 18 are both applied to the input voltage of the half-bridge converter. Even if the input voltage by which the voltage applied to the magnetron 36 becomes smaller than the predetermined value (for example, 3.8 kV–4.0 kV) is applied, no current flows in the magnetron 36, and therefore, no energy is transferred from the primary circuit to the secondary circuit of the high frequency transformer 34. However, the energy stored in the common mode choke coil 18 increases the input voltage, and therefore, as shown by a dotted line in FIG. 16, a beginning and an end of the oscillation of the magnetron 36 are advanced and delayed. Therefore, according to the embodiment shown in FIG. 14, the primary current becomes larger, and it can be expected to improve a power factor.

Figure 17:
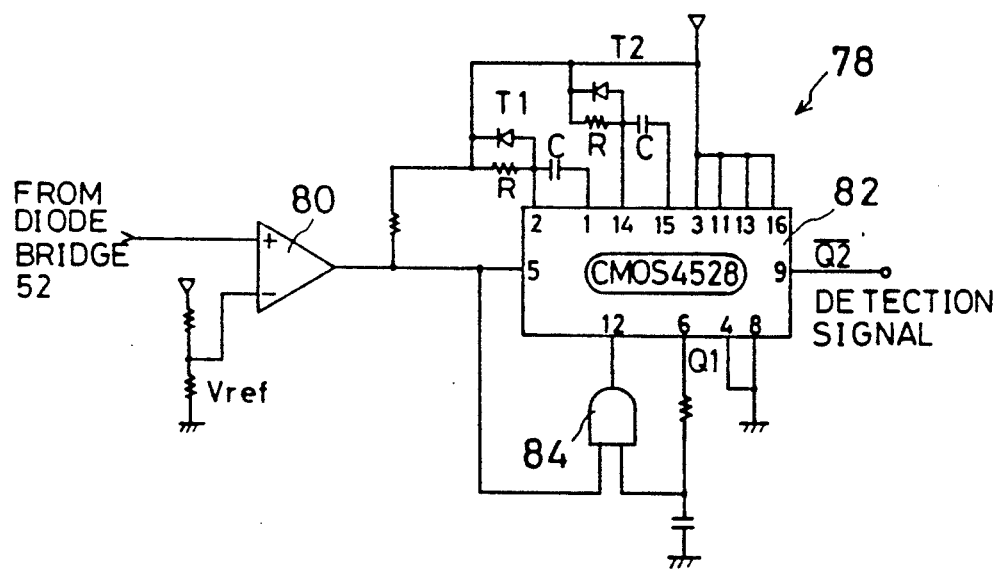
FIG. 17 is a circuit diagram showing one example of a diode failure detecting circuit.

In FIG. 17, a detecting circuit 78 for detecting that the diode 38 which constitutes the voltage doubler rectifying circuit connected to the secondary winding 34b of the high frequency transformer 34 broke down is shown. The detecting circuit 78 includes a comparator 80, and the output from the diode bridge 52 shown in FIG. 4 is applied to one input of the comparator 80, and the other input of the comparator 80 receives a reference voltage. Therefore, the comparator 80 detects whether or not the output of the diode bridge 52 becomes larger than a predetermined level. An output of the comparator 80 is applied to a trigger input (the 5th terminal) of a retriggerable monostable multivibrator 82. The retriggerable monostable multivibrator 82 outputs a successive signal of a high level or a low level when a succeeding trigger input is applied thereto within a predetermined time T1, due to an operation of an AND gate 84. The above described constant time T1 is determined by a resistor R and a capacitor C as shown in FIG. 17.

Figure 18A:
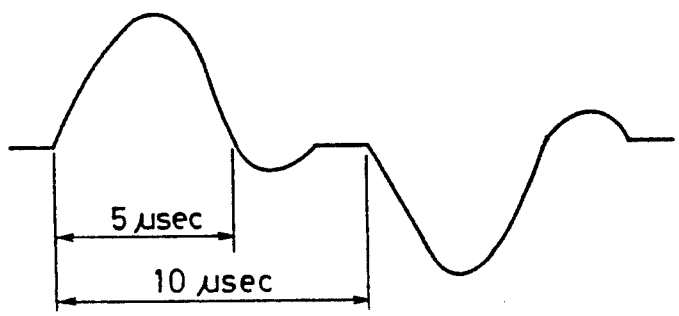
Figure 18B:
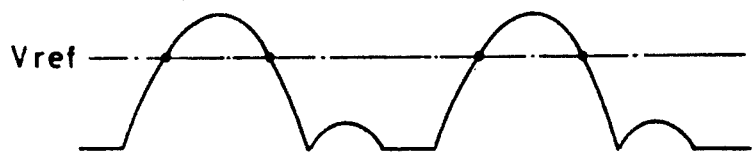
Figure 18C:
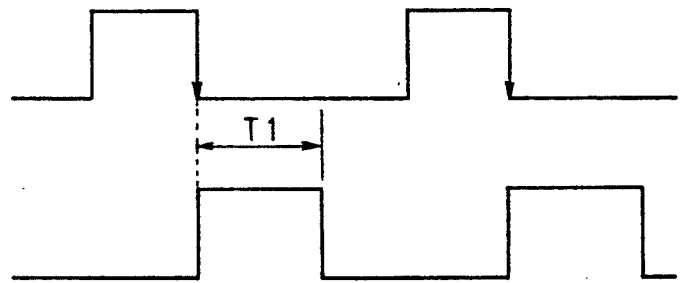
Figure 18D:
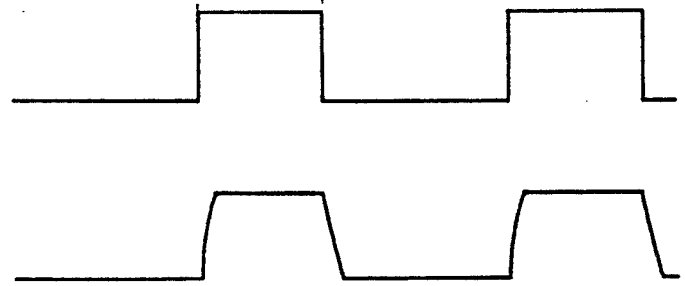
Figure 18E:
Figure 18F:
Figure 18F:

In a state where the diode 38 does not break down, the primary current as shown in FIG. 18(A) flows in the primary winding 34a of the high frequency transformer 34. Therefore, the output of the diode bridge 52 becomes as shown in FIG. 18(B), and therefore, it exceeds the reference voltage only a timing when the primary current is in a positive half. Therefore, the output of the comparator 80 becomes as shown in FIG. 18(C), a period of a high level becomes longer than the constant time T1. Therefore, an output from the 9th terminal of the retriggerable monostable multivibrator 82 becomes a successive signal of a high level as shown in FIG. 18(G). In addition, FIG. 18(E) and FIG. 18(F) show one input of the AND gate 84 and an output thereof, respectively.

Figure 19A:
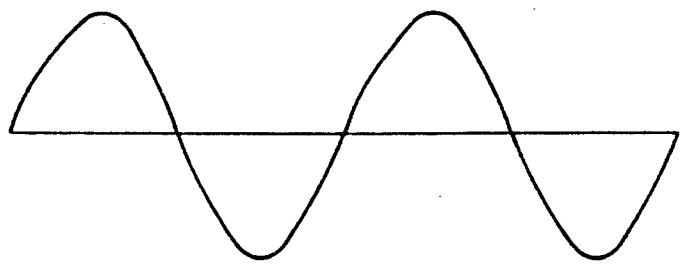
Figure 19C:
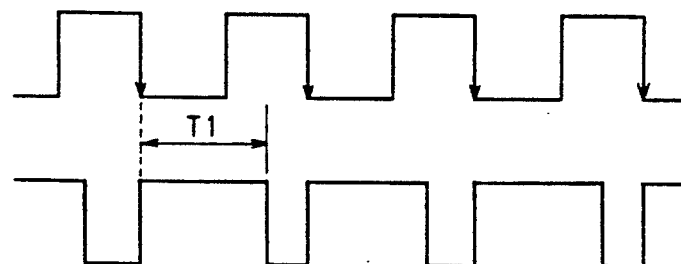
Figure 19D:
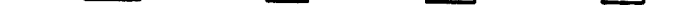
Figure 19E:
Figure 19F:

In a state where the diode 38 is destroyed, in the primary winding 34a of the high frequency transformer 34, the primary current as shown in FIG. 19(A) flows. Therefore, the output of the diode bridge 52 becomes as shown in FIG. 19(B), and it exceeds the reference voltage at every positive and negative halves of the primary current. Therefore, the output of the comparator 80 becomes as shown in FIG. 19(C), and therefore, a period of a high level becomes shorter than the constant time T1. Therefore, the output from the 9th terminal of the retriggerable monostable multivibrator 80 becomes a successive signal of a low level as shown in FIG. 19(G). In addition, FIG. 19(E) and FIG. 19(F) show the one input of the AND gate 84 and the output thereof, respectively. The successive signal of a low level from the retriggerable monostable multivibrator 82 is applied to the microcomputer 50 (FIG. 4) as an abnormal state detection signal, for example.

Instead of the detecting circuit 78 shown in FIG. 17, a circuit shown in FIG. 20 may be utilized. In an embodiment shown in FIG. 20, a terminal voltage of the detecting resistor 32 shown in FIG. 1 is applied to one input of a comparator 86. Then, a reference voltage 88 is applied to the other input of the comparator 86. As similar to the comparator 80 shown in FIG. 17, the comparator 86 detects a current level of a negative half of the primary current. Therefore, when the current level of the negative half of the primary current exceeds a predetermined value due to a failure of the diode 38, as shown in FIG. 19(A), a detection signal is outputted from the comparator 86.

Figure 21:
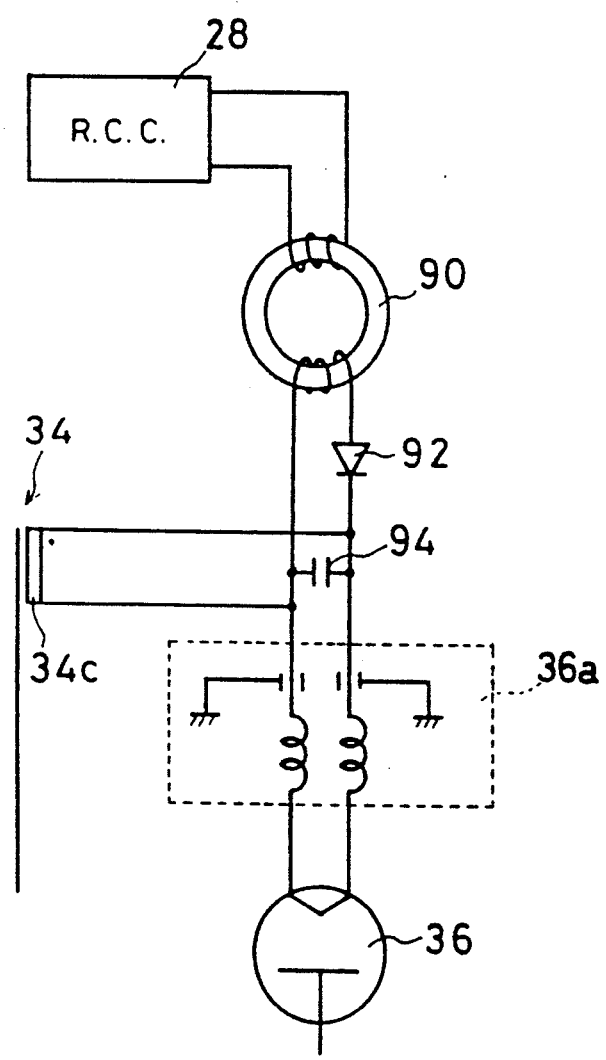
FIG. 21 is a circuit diagram showing a modified example of a heater circuit of a magnetron.

In an embodiment shown in FIG. 21, the heater of the magnetron 36 is heated by the output of the secondary winding 34c of the high frequency transformer 34 as well as an output of the ringing choke converter 28 applied through a ring core 90. More specifically, an output line of the ringing choke converter 28 shown in detail in FIG. 22 is wound on the ring core 90. A further winding is provided on the ring core 90 and the further winding is connected to the cathode of the magnetron 36 through a diode 92. Therefore, to the heater, the output of the ringing choke converter 28 induced through the ring core 90 is applied together with the output of the secondary winding 34c. However, the heater current may be supplied to the heater of the magnetron 36 by only the ringing choke converter 28. In addition, a capacitor 94 functions as a smoothing capacitor. Furthermore, other outputs of the ringing choke converter 28 are utilized as a power source for the control circuit 12 (FIG. 1 or FIG. 4) and a voltage source for the driver 62 (FIG. 4).

According to the embodiment shown in FIG. 21, it can be expected the following advantages. More specifically, as shown in FIG. 1 or FIG. 21, the high frequency filter 36a is incorporated in the magnetron 36, and impedance of the high frequency filter 36a varies by $2\pi fL$ (L is inductance of the high frequency filter).

Therefore, since the oscillation frequency of the half-bridge converter is changed so that the output power of the magnetron 36 is controlled, it is difficult to flow a constant heater current. Then, as done in this embodiment shown in FIG. 21, if the heater current is also supplied to the heater a further power source which is indispensable to the half-bridge converter, for example, the ringing choke converter 28, it is possible to flow a constant current to the heater of the magnetron 36 in spite of the operating frequency of the half-bridge converter, and therefore, a stable operation of the magnetron 36 can be expected.

In addition, a overcurrent detecting circuit 68 shown in FIG. 4 outputs a high level signal when the same detects too large primary current, and an abnormal voltage detecting circuit 70 outputs a high level signal when the same detects too large or too small power source voltage. Outputs of the overcurrent detecting circuit 68 and the abnormal voltage detecting circuit 70 are applied to a flip-flop 74 through an OR gate 72. Therefore, when an abnormal state occurs in the half-bridge converter, a signal from the flip-flop 74 is applied to the 1st terminal (FIG. 7) of the integrated circuit "GP605". Therefore, an operation of the V/F converting circuit 60 is stopped, and therefore, the switching control signals QA and QB both remain at high levels, and accordingly, the operation of the half-bridge converter is stopped.

In addition, the band-pass filter 54 which functions as the harmonic component deriving means and the smoothing circuit 55 which functions as the averaging means shown in FIG. 4 may be replaced with a single low-pass filter.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A power source apparatus for a magnetron operating from a commercial alternating current power supply, comprising:
    a half-bridge converter driven by a commercial power supply, said half-bridge converter including a first series connection of first and second switching elements,
    a second series connection connected in parallel to the first series connection and including first and second resonance capacitors, and
    a high frequency transformer including a primary winding connected between a connection point of the first series connection and a connection point of the second series connection and a secondary winding magnetically coupled to the primary winding for supplying a voltage to a magnetron having a heater;
    setting voltage output means for outputting a setting voltage for commanding a desired output power of the magnetron;
    current detecting means for detecting a current flowing in the primary winding of said high frequency transformer;
    averaging means for averaging said current detected by the current detecting means and producing a voltage corresponding thereto;
    error voltage output means for producing an error voltage according to a difference between a voltage produced by said averaging means and said setting voltage; and
    switching control means for controlling the first and second switching elements on the basis of the magnitude of said error voltage, said switching control means including means for generating first and second switching signals in a dual mode to alternately turn-on the first and second switching elements at a frequency in proportion to the magnitude of the error voltage.

2. A power source apparatus for a magnetron according to claim 1, wherein the switching control means includes voltage/frequency converting means for outputting two switching signals, a frequency of each of said switching signals being changed according to the magnitude of the error voltage but each of said switching signals having a constant ON time.

3. A power source apparatus for a magnetron according to claim 1, wherein the first series connection includes a connecting line for connecting the first and second switching elements to each other, and the current detecting means includes a current transformer coupled to said connecting line for detecting currents respectively flowing in said first and second switching elements.

4. A power source apparatus for a magnetron according to claim 3, wherein the connecting line includes a first portion where a current of the first switching element flows the same direction as a current flowing the second switching element, and the current transformer is coupled to said first portion of the connecting line and a second portion where the current of the second switching element flows.

5. A power source apparatus for a magnetron according to claim 1, further comprising stopping means for controlling the switching control means to stop switching operations of the first and second switching elements when a current detected by the current detecting means becomes more than a predetermined value.

6. A power source apparatus for a magnetron according to claim 1, wherein the averaging means includes harmonic component deriving means for receiving an output of the current detecting means and for deriving a harmonic component of a fundamental wave of the commercial power source.

7. A power source apparatus for a magnetron according to claim 6, wherein the harmonic component deriving means includes second harmonic component deriving means for deriving a component having a frequency of twice the fundamental wave.

8. A power source apparatus for a magnetron according to claim 6, wherein the harmonic component deriving means includes a filter circuit.

9. A power source apparatus for a magnetron according to claim 1, further comprising rectifying means for rectifying an alternate current from the commercial power source; and a choke coil connected between the rectifying means and the half-bridge converter.

10. A power source apparatus for a magnetron according to claim 9, further comprising a power source circuit for supplying a voltage to the switching signal generating means to generate the first and second switching signals; and heater current supplying means for supplying a current to the heater of the magnetron from the power source circuit.

11. A power source apparatus for a magnetron according to claim 10, wherein the power source circuit includes a ringing choke converter driven by the output of the rectifying means.

12. A power source apparatus for a magnetron operating from a commercial alternating current power supply, comprising:
a half-bridge converter driven by a commercial power supply, said half-bridge converter including
a first series connection of first and second switching elements,
a second series connection connected in parallel to the first series connection and including first and second resonance capacitors, and
a high frequency transformer including a primary winding connected between a connection point of the first series connection, and a connection point of the second series connection, and a secondary winding magnetically coupled to the primary winding for supplying a voltage to a magnetron having a heater;
setting voltage output means for outputting a setting voltage for commanding a desired output power of the magnetron;
current detecting means for detecting a current flowing in the primary winding of said high frequency transformer;
averaging means for averaging said current detected by the current detecting means and producing a voltage corresponding thereto;
error voltage output means for producing an error voltage according to a difference between a voltage produced by said averaging means and said setting voltage;
voltage detecting means for detecting a voltage level of the commercial power supply; and
switching control means for controlling the first and second switching elements on the basis of the magnitude of said error voltage, the switching control means includes
means for generating first and second switching signals in a dual mode to alternately turn-on the first and second switching elements at a frequency in proportion to the magnitude of the error voltage, and
control means for controlling the switching signal generating means to make the switching signal generating means operate in the dual mode after the switching signal generating means operates in a single mode where the first and second switching signals are in phase, in response to a detection output from said voltage level detecting means that said voltage level of the commercial power supply is less than a predetermined value.

13. A power source apparatus for a magnetron operating from a commercial alternating current power supply comprising:
a half-bridge converter driven by a commercial power supply, said half-bridge converter including
a first series connection of first and second switching elements,
a second series connection connected in parallel to the first series connection and including first and second resonance capacitors, and
a high frequency transformer including a primary winding connected between a connection point of the first series connection and a connection point of the second series connection, and a secondary winding magnetically coupled to the primary winding for supplying a voltage to a magnetron having a heater;
setting voltage output means for producing a setting voltage for commanding a desired output power of the magnetron;
current detecting means for detecting a current flowing in the primary winding of said high frequency transformer;
averaging means for averaging said current detected by the current detecting means and producing a voltage corresponding thereto;
error voltage output means for producing an error voltage according to a difference between a voltage produced by said averaging means and said setting voltage;
switching control means for controlling the first and second switching elements on the basis of a magnitude of said error voltage, said switching control means including means for generating first and second switching signals in a dual mode to alternately turn-on the first and second switching elements at a frequency in proportion to the magnitude of the error voltage,
voltage detecting means for detecting a voltage level of the commercial power supply;
start detecting means for detecting whether or not the magnetron has been started and producing a start detection signal in response thereto;
stopping means for stopping at least one of the first and second switching signals from the switching signal generating means in response to a detection signal from the voltage detecting means that the voltage level of the commercial power supply exceeds a predetermined level upon detection by said start detecting means that the magnetron has not been started; and
releasing means for releasing a stop of said at least one of the first and second switching signals in response to a detection signal from the start detecting means that the magnetron has been started.

14. A power source apparatus for a magnetron according to claim 13, further comprising a cooling fan for the magnetron; and fan stopping means receiving the start detection signal and stopping the cooling fan until the start detecting means detects that the magnetron has been started.

15. A power source for a magnetron comprising:
rectifying means for rectifying an A.C. current to output a D.C. current, said rectifying means including a rectifying circuit and a circuit for smoothing an output of the rectifying circuit;
a half-bridge converter driven by said D.C. current, said half-bridge converter including
a first series connection of first and second switching elements,
a second series connection connected in parallel to the first series connection and including first and second resonance capacitors, and
a high frequency transformer including a primary winding connected between a connection point of the first series connection, and a connection point of the second series connection, and a secondary winding magnetically coupled to the primary winding for supplying a voltage to a magnetron having a heater;
said half-bridge converter forming a current resonance with a primary leakage inductance of said high frequency transformer and said first and second resonance capacitors;

output means for producing a setting voltage for commanding a desired output power of the magnetron;

current detecting means for detecting a current flowing in the primary winding of said high frequency transformer;

averaging means for averaging the current detected by said current detecting means and producing a voltage corresponding thereto;

error voltage means for producing an error voltage according to a difference between a voltage obtained by said averaging means and said setting voltage; and switching control means for controlling the first and second switching elements on the basis of the magnitude of said error voltage.

16. A power source according to claim 15, wherein said smoothing circuit comprises a choke coil connected between said rectifying circuit and said half-bridge converter, and a smoothing capacitor connected to said coil and comprising said first and second resonance capacitors.

17. A power source according to claim 15, further comprising means for controlling the switching control means to stop switching operations of the first and second switching elements when a current detected by the current detecting means becomes more than a predetermined value.

18. A power source according to claim 15, wherein said switching control means includes means for generating first and second switching signals in a dual mode so as to alternately turn-on the first and second switching elements at a frequency in proportion to the magnitude of the error voltage.

19. A power source according to claim 18, further comprising means for detecting a voltage level of the commercial power supply; and said switching control means further comprises means for controlling the switching signal generating means to make the switching signal generating means operate in the dual mode, after the switching signal generating means operates in a single mode where the first and second switching signals are in phase, in response to an output from said voltage detecting means that said voltage level of the commercial power supply is less than a predetermined value.

20. A power source according to claim 18, further comprising:

means for detecting a voltage level of the commercial power supply;

start detecting means for detecting whether or not the magnetron has been started;

stopping means for stopping at least one of the first and second switching signals from the switching signal generating means in response to a signal from the voltage detecting means that the voltage level of the commercial power supply exceeds a predetermined level when it is detected by the start detecting means that the magnetron has not been started; and release means for releasing said stopping means from stopping at least one of the first and second switching signals in response to a signal from the start detecting means that the magnetron has been started.

21. A power source according to claim 20, further comprising a cooling fan directed at the magnetron; and means connected to the start detecting means for stopping the cooling fan until the start detecting means detects that the magnetron has been started.

22. A power source according to claim 18, further comprising means for supplying a voltage to the switching signal generating means to produce the first and second switching signals; and means for supplying a current to the heater of the magnetron from the power source circuit.

23. A power source according to claim 22, wherein the power source circuit includes a ringing choke converter driven by the output of the rectifying means.

24. A power source for a magnetron comprising:

rectifying means for rectifying an A.C. current to output a D.C. current, said rectifying means including a rectifying circuit and a smoothing circuit for smoothing an output of the rectifying circuit;

a half-bridge converter which is driven by said D.C. current, said half-bridge converter including
a first series connection of first and second switching elements,
a second series connection connected in parallel to the first series connection and including first and second resonance capacitors, and
a high frequency transformer including a primary winding connected between a connection point of the first series connection and a connection point of the second series connection and a secondary winding magnetically coupled to the primary winding for supplying a voltage to a heater of the magnetron, said half-bridge converter forming a current resonance with a primary leakage inductance of said high frequency transformer and said first and second resonance capacitors;

setting voltage output means for producing a setting voltage for commanding a desired output power of the magnetron;

current detecting means for detecting a current flowing in the primary winding of said high frequency transformer;

averaging means for averaging the current detected by said current detecting means and producing a voltage corresponding thereto;

error voltage output means for producing an error voltage according to a difference between a voltage obtained by said averaging means and the setting voltage; and switching control means for controlling the first and second switching elements in response to the magnitude of said error voltage, said switching control means including voltage/frequency converting means for producing two switching signals, a frequency of each of said switching signals being changed according to the magnitude of the error voltage with each of said switching signals having a constant ON time.

25. A power source according to claim 24, further comprising means for controlling the switching control means to stop switching operations of the first and second switching elements when a current detected by the current detecting means becomes more than a predetermined value.

26. A power source for a magnetron comprising:
rectifying means for rectifying an A.C. current to output a D.C. current, said rectifying means including a rectifying circuit and a smoothing circuit for smoothing an output of the rectifying circuit;

a half-bridge converter which is driven by said D.C. current, said half-bridge converter including a first series connection of first and second switching elements, said first series connection including a connecting line for connecting the first and second switching elements to each other, said connecting line including a first portion in which a current of the first switching element flows in the same direction as a current flowing in the second switching element, a second series connection connected in parallel to the first series connection and including first and second resonance capacitors, and a high frequency transformer including a primary winding connected between a connection point of the first series connection and a connection point of the second series connection, and a secondary winding magnetically coupled to the primary winding for supplying a voltage to a heater of the magnetron, said half-bridge converter forming a current resonance with a primary leakage inductance of said high frequency transformer and said first and second resonance capacitors;

setting voltage output means for producing a setting voltage for commanding a desired output power of the magnetron;

current detecting means for detecting a current flowing in the primary winding of said high frequency transformer; said current detecting means including a current transformer coupled to said connecting line for detecting currents respectively flowing in said first and second switching elements, said current transformer being coupled to said first portion of the connecting line and a second portion in which the current of the second switching element flows;

averaging means for averaging the current detected by said current detecting means and producing a voltage corresponding thereto;

error voltage output means for producing an error voltage according to a difference between a voltage produced by the averaging means and said setting voltage; and switching control means for controlling the first and second switching elements on the basis of the magnitude of said error voltage.

27. A power supply according to claim 26, wherein said switching control means includes voltage/frequency converting means for outputting two switching signals, a frequency of each of said switching signals being changed according to the magnitude of the error voltage, but each of said switching signals having a constant ON time.

28. A power source for a magnetron comprising:

means for rectifying an A.C. current of a commercial power source to output a D.C. current;

a half-bridge converter driven by said D.C. current, said half-bridge converter including a first series connection of first and second switching elements, a second series connection connected in parallel to the first series connection and including first and second resonance capacitors, and a high frequency transformer including a primary winding connected between a connection point of said first series connection and a connection point of said second series connection, and a secondary winding magnetically coupled to the primary winding for supplying a voltage to a magnetron having a heater, said half-bridge converter forming a current resonance with a primary leakage inductance of said high frequency transformer and said first and second resonance capacitors;

setting voltage output means for producing a setting voltage for commanding a desired output power of the magnetron;

current detecting means for detecting a current flowing in the primary winding;

averaging means for averaging said current detected by said current detecting means and producing a voltage corresponding thereto, said averaging means including means for receiving an output of the current detecting means and for deriving a harmonic component of a fundamental wave of the commercial power supply;

error voltage output means for producing an error voltage according to a difference between a voltage obtained by said averaging means and said setting voltage; and switching control means for controlling the first and second switching elements operating on the basis of the magnitude of said error voltage, said switching control means including voltage/frequency converting means for producing two switching signals, a frequency of each of said switching signals being changed according to the magnitude of the error voltage with each of said switching signals having a constant ON time.

29. A power source according to claim 28, wherein the harmonic component deriving means includes second harmonic component deriving means for deriving a component having a frequency of twice the fundamental wave.

30. A power source according to claim 28, wherein the harmonic component deriving means includes a filter circuit.

* * * * *